(12) United States Patent
Cam-Winget et al.

(10) Patent No.: US 11,972,007 B2
(45) Date of Patent: Apr. 30, 2024

(54) ENFORCING LOCATION-BASED DATA PRIVACY RULES ACROSS NETWORKED WORKLOADS

(71) Applicant: Cisco Technology, Inc., San Jose, CA (US)

(72) Inventors: Nancy Patricia Cam-Winget, Mountain View, CA (US); Eric Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 17/546,991

(22) Filed: Dec. 9, 2021

(65) Prior Publication Data

US 2023/0185939 A1 Jun. 15, 2023

(51) Int. Cl.
G06F 21/62 (2013.01)
G06F 16/14 (2019.01)
G06F 21/12 (2013.01)
G06F 21/57 (2013.01)
H04L 9/40 (2022.01)
H04L 67/56 (2022.01)

(52) U.S. Cl.
CPC ........ G06F 21/6218 (2013.01); G06F 16/144 (2019.01); G06F 21/123 (2013.01); G06F 21/57 (2013.01)

(58) Field of Classification Search
CPC .. G06F 21/6218; G06F 16/144; G06F 21/123; G06F 21/57; G06F 2221/2111; G06F 21/6254; H04L 67/56; H04L 63/107
See application file for complete search history.

(56) References Cited

U.S. PATENT DOCUMENTS

| 11,570,264 B1 | 1/2023 | Poornachandran et al. |
| 2013/0198797 A1 | 8/2013 | Raghuram et al. |
| 2015/0082045 A1 | 3/2015 | D'Souza et al. |
| 2017/0170970 A1 | 6/2017 | Leighton et al. |
| 2019/0138729 A1 | 5/2019 | Blundell |

(Continued)

FOREIGN PATENT DOCUMENTS

CN 115098866 A * 9/2022
WO WO2021067510 A1 4/2021

OTHER PUBLICATIONS

Davari, Maryam, et al, "Access Control Model Extensions to Support Data Privacy Protection based on GDPR" 2019 IEEE International Conference on Big Data (Big Data), IEEE, Dec. 9, 2019 (Dec. 9, 2019), pp. 4017-4024, XP033721622.

(Continued)

*Primary Examiner* — J. Brant Murphy
*Assistant Examiner* — Aayush Aryal
(74) *Attorney, Agent, or Firm* — Lee & Hayes, P.C.

(57) ABSTRACT

Techniques for maintaining geographic-based data privacy rules in networked environments. An example method includes receiving a request from a user device; generating, based on the request, a query for data associated with fulfilling the request; transmitting, to a data controller, the query; transmitting, to the data controller, an indication of a geographic region in which at least one device implementing the entity is located; and receiving, from the data controller, a portion of the data associated with fulfilling the request.

20 Claims, 7 Drawing Sheets

(56) References Cited

U.S. PATENT DOCUMENTS

| | | |
|---|---|---|
| 2019/0155728 A1 | 5/2019 | Ferguson et al. |
| 2019/0220601 A1 | 7/2019 | Sood et al. |
| 2019/0281131 A1* | 9/2019 | Bartholomew ..... H04L 67/1097 |
| 2020/0210585 A1 | 7/2020 | Thom et al. |
| 2021/0021619 A1 | 1/2021 | Smith et al. |
| 2021/0111892 A1* | 4/2021 | Vahldiek-Oberwagner ................. G06F 21/57 |
| 2021/0194912 A1 | 6/2021 | Ward et al. |
| 2021/0216658 A1* | 7/2021 | Watson ............... G06F 21/6227 |
| 2021/0263757 A1 | 8/2021 | Tsirkin |
| 2022/0345484 A1 | 10/2022 | Drozd et al. |
| 2023/0185760 A1 | 6/2023 | Balle et al. |
| 2023/0185918 A1 | 6/2023 | Voit et al. |

OTHER PUBLICATIONS

PCT Search Report and Written Opinion dated Mar. 20, 2023 for PCT Application No. PCT/US2022/052300, 16 pages.

Singh, Jatinder, et al., "Enclaves in the Clouds: Legal Considerations and Broader Implications", ACM Queue: Tomorrow's Computing Today, Association for Computing Machinery, New York, NY, US, vol. 18, No. 6, Dec. 31, 2020 (Dec. 31, 2020), pp. 1-37, XP058487713.

\* cited by examiner

ENFORCING LOCATION-BASED DATA PRIVACY RULES ACROSS NETWORKED WORKLOADS

TECHNICAL FIELD

The present disclosure relates generally to techniques for enforcing location-based data privacy rules across networked environments.

BACKGROUND

In a cloud-computing environment, workloads can be distributed across multiple devices located in different data centers. In some cases, the data centers can be located in different geographical locations, such as different cities, different countries, or even different continents. Furthermore, it may be efficient to redistribute workloads over different locations, depending on the availability of cloud computing resources, the locations of end user devices, and the latency requirements of data being transmitted between the cloud-computing environment and the end user devices. For example, it may be beneficial to shift a workload providing latency-sensitive data to a user device a region located near the user device. Similarly, if a pool of computing resources in data centers located in one region is relatively congested, it may be beneficial to transfer workloads to other data centers located in other regions.

Different geographical regions, however, may be subjected to different data privacy rules. In particular, the European Union (EU) enforces the General Data Protection Regulation (GDPR), governing the transfer of personal data collected and/or stored within EU borders. In some cases, entities controlling devices within EU borders are legally obligated, under the GDPR, to prevent personal data from being transferred to devices outside of EU borders. However, in networked environments spanning regions within the EU and outside of the EU, it can be difficult to enforce GDPR restrictions. Furthermore, it can be difficult for those entities to document any transfers of personal data, which can make them liable under the GDPR.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
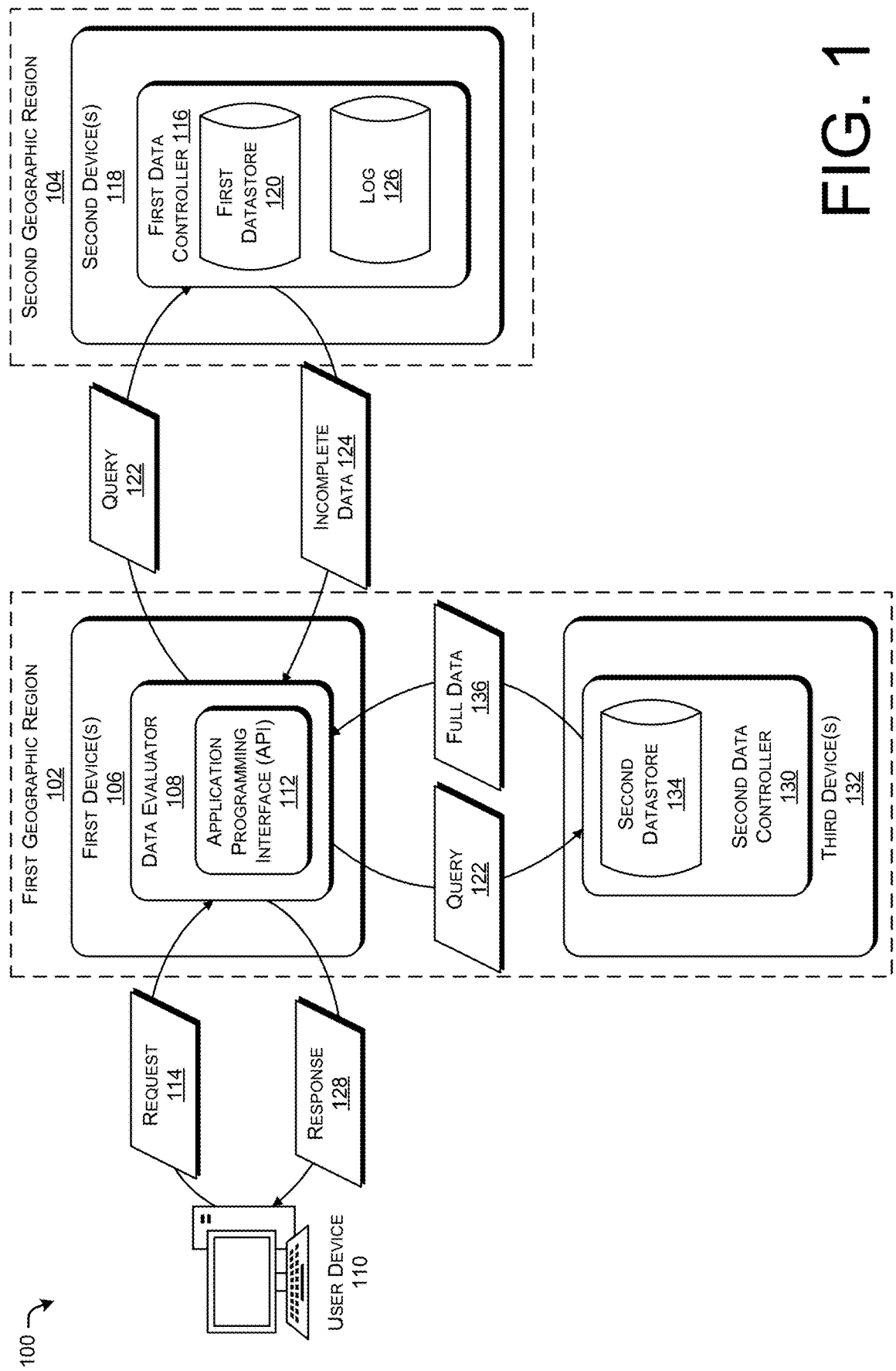
FIG. 1 illustrates an example environment for maintaining sensitive data in a cloud-based network that is distributed over multiple geographic regions.

Various implementations for complying with geographically defined data privacy rules are described. An example method includes receiving a request from a user device; generating, based on the request, a query for data associated with fulfilling the request; transmitting, to a data controller, the query; transmitting, to the data controller, an indication of a geographic region in which at least one device implementing the entity is located; and receiving, from the data controller, a portion of the data associated with fulfilling the request.

In some cases, the geographic region is a first geographic region and the at least one device is at least one first device, wherein the data controller is implemented by at least one second device located in a second geographic region. A data privacy rule of the second geographic region may be more stringent than a data privacy rule of the first geographic region. According to some implementations, the request is received by an application programming interface (API) implemented by the entity.

In various examples, the method also includes generating a response based on the portion of the data; and transmitting, to the user device via an application programming interface (API), the response.

According to some examples, the portion of the data is a first portion of the data, and the method further includes receiving, from the data controller, an indication that a second the data is subjected to a data privacy rule. For example, the response further indicates that the response is a partial response because the data controller is subjected to a data privacy rule.

In some implementations, the data controller is a first data controller, and the method further includes based on receiving the portion of the data, transmitting, to a second data controller, the query; receiving, from the second data controller, a complete copy of the data; generating a response based on the complete copy of the data; and transmitting, to the user device via an application programming interface (API), the response. In various cases, wherein the entity includes a trusted execution environment (TEE) of at least one first device, and the data controller is implemented in a TEE of at least one second device.

Example Embodiments

This disclosure describes various techniques for complying with geographic-based data privacy rules in computer networks that span multiple geographic regions. In various implementations, a first subsystem (e.g., a data evaluator) may request data from a second subsystem (e.g., a data controller) in a networked environment. The first subsystem may be located in a first geographic region and the second subsystem may be located in a second geographic region. According to some examples, the second geographic region may be associated with a data privacy rule that prohibits or otherwise restricts the sharing of sensitive data outside of the second geographic region. In various examples described herein, the second subsystem may determine that the first subsystem is located outside of the second geographic region. Accordingly, the second subsystem may refrain from sharing any sensitive data with the first subsystem, even if the first subsystem requests the sensitive data. In various cases, the second subsystem may further log or track any instance in which it shares sensitive data outside of the second subsystem.

The present disclosure describes various improvements to the technical field of computer networking. By confirming that a destination complies with a data privacy rule prior to transmitting data to the destination, an entity can ensure compliance with the data privacy rule. Thus, networks can include devices distributed over multiple geographic regions, and can flexibly distribute workloads over multiple geographic regions, without violating applicable data privacy rules. In addition, by tracking how sensitive data is shared within the network in logs, entities may be able to effectively prove to legal authorities that they are in compliance with applicable data privacy rules.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for maintaining sensitive data in a cloud-based network that is distributed over multiple geographic regions. In particular, the environment 100 includes devices distributed over a first geographic region 102 and a second geographic region 104. As used herein, the terms "geographic region," "geolocation," "region," and their equivalents, may refer to a physical area defined by at least one border. Examples of geographic regions include political and/or economic unions, countries, states, provinces, municipalities, cities, counties, and the like. The first geographic region 102 may be different than the second geographic region 104. For instance, the first geographic region 102 may be in a different country or state than the second geographic region 104.

At least one first device 106 may be located within the first geographic region 102. The first device(s) 106 may include at least one computing device in a networked environment. As used herein, the term "computing device," and its equivalents, may refer to a hardware device including at least one processor configured to execute operations. Examples of computing devices include servers, personal computers, laptop computers, tablet computers, mobile phones, Internet of Things (IoT) devices, and so on. In some cases, one computing device may communicate with another computing device over at least one interface. For example, computing devices may communicate via at least one wired interface (e.g., Ethernet, optical fiber, etc.) and/or at least one wireless interface (e.g., ZIGBEE, BLUETOOTH, WI-FI, LTE, NR, etc.). The first device(s) 106, in various cases, are physically present and operating within the first geographic region 102. In various implementations, the first device(s) 106 include one or more servers in a data center that is located in the first geographic region 102.

The first device(s) 106 may include, or otherwise implement, a data evaluator 108. As used herein, the term "data evaluator," "data processor," and their equivalents, may refer to an entity that processes data on behalf of a data controller. In some cases, the data evaluator 108 is implemented in software executed by the first device(s) 106. For example, the data evaluator 108 may be a virtual machine (VM) operating on the first device(s) 106, a microservice executed by the first device(s) 106, a process executed by the first device(s) 106, or the like. According to some implementations, the data evaluator 108 is part of a confidential computing environment and is executed within a trusted execution environment (TEE) of the first device(s) 106. As used herein, the term "confidential computing," and its equivalents, may refer to techniques for securing code and/or data during execution. In some cloud-based computing environments, data is encrypted when it is stored and when it is transmitted across interfaces. However, the data is typically decrypted when it is executed by devices within the environments. Confidential computing refers to techniques for securing the data when it is executed by the processor(s) of physical devices within a cloud-based environment. As used herein, the terms "trusted execution environment," "TEE," and their equivalents, may refer to a portion of a processor that maintains confidentiality and integrity of data that is loaded and/or processed in the TEE.

A user device 110 may interact with the data evaluator 108 via an application programming interface (API) 112. As used herein, the terms "application programming interface," "API," and their equivalents, may refer to a software-based link between multiple software components across a network. Although the user device 110 is illustrated as being outside of the first geographic region 102, implementations are not so limited. In some cases, the user device 110 is physically located within the first geographic region 102. The user device 110 may be a computing device operated by a user (not illustrated). The user device 110 may connect to various resources within the cloud-based network via the API 112.

In various implementations, the user device 110 may transmit a request 114 to the data evaluator 108. In some implementations, the request 114 may be in the form of one or more data packets transmitted from the user device 110 to the first device(s) 106 and addressed to the data evaluator 108. The request 114 may be encrypted during transmission and may be decrypted by the data evaluator 108. In various cases, the request 114 may instruct the data evaluator 108 to determine and report the answer to a particular question specified in the request 114.

The data evaluator 108 may determine that fulfillment of the request 114 may involve data that is not stored or otherwise immediately accessible by the data evaluator 108. That is, to generate the answer to the question specified by the request 114, the data evaluator 108 may refer to other data that it does not directly have access to. For example, the data may not be stored on the first device(s) 106. In some implementations, the data may be stored within a distributed mesh including the data evaluator 108 and one or more additional subsystems operating on a collection of physical devices in a distributed network, but the data may be stored outside of the first device(s) 106. In some cases, the mesh may be exclusively executed within TEEs of various devices, such that the entire mesh maintains data confidentiality and integrity within the environment 100. Furthermore, the data may include sensitive data. As used herein, the term "sensitive data," and its equivalents, may refer to data associated with at least one privacy restriction. Examples of sensitive data include trade secrets, state secrets, personal data, and/or other types of confidential information.

The mesh may include a first data controller 116 that is executed by one or more second devices 118. As used herein, the term "data controller," and its equivalents, may refer to an entity that maintains (e.g., stores) data and selectively provides the data to other entities within a network. For example, a data controller may be an entity that, when alone or joined with others, determines the purpose of sensitive data and/or the means of processing it. The second device(s) 118 may be located in the second geographic region 104. In various implementations, the first data controller 116 includes a first datastore 120 that stores, among other information, the data that can be used to fulfill the request 114. The data may be encrypted when it is stored within the first datastore 120.

The data evaluator 108 may seek to obtain the data for fulfilling the request 114 by generating a query 122 requesting the data. The data evaluator 108 may transmit the query 122 to the first data controller 116. In some implementations, the query 122 is encrypted during transmission to the first data controller 116.

According to various implementations, the second geographic region 104 may be subjected to a data privacy rule. As used herein, the term "data privacy rule," and its equivalents, may refer to a restriction on the type of data that an entity may expose to other entities. In various implementations, a data privacy rule can be a law. For example, devices and entities within the EU are subjected to the EU's GDPR, which restricts how personal data can be shared. As used herein, the term "personal data," and its equivalents, may refer to information that relates to an identified or identifiable individual. The individual, for instance, is a living individual. Examples of personal data include a name of the individual, contact information of the individual (e.g., a phone number, a mailing address, etc.), an internet protocol (IP) address of the individual, a cookie identifier of the individual, a medical record of the individual, a financial record of the individual, a location of the individual, demographics of the individual (e.g., gender, ethnicity, religious beliefs, etc.), political opinions of individual, biometric characteristics of the individual, or any other identifier of the individual. The EU's GDPR provides strict privacy and security standards for personal data, and imposes penalties (e.g., fines) for entities that do not satisfy these standards.

Other jurisdictions enforce other data privacy rules that restrict the sharing of personal data in certain circumstances, such as the United Kingdom (UK) GDPR. Other jurisdictions that restrict sharing personal data include Argentina, Brazil, Chile, Japan, South Korea, and Turkey. Within the United States (US), the California Consume Privacy Act (CCPA) restricts how entities within the state of California can share personal data.

Because the first data controller 116 is operating on the second device(s) 118 within the second geographic region 104, the first data controller 116 is subjected to the data privacy rule. For instance, the data privacy rule may restrict how the sensitive data within the first datastore 120 is stored and/or how the sensitive data may be shared. Therefore, prior to sharing the requested data with the data evaluator 108 or any other receiving entity, the first data controller 116 may be configured to confirm whether the receiving entity complies with the data privacy rule.

In particular examples, the data privacy rule may prohibit or otherwise restrict the sharing of sensitive data with entities outside of the second geographic region 104. For instance, the first data controller 116 may infer that other entities within the second geographic region 104 comply with the data privacy rule, but that entities outside of the second geographic region 104 may be out of compliance with the data privacy rule. Accordingly, the first data controller 116 may selectively expose sensitive data in the first datastore 120 to other trusted entities within the second geographic region 104, but may refrain from providing the sensitive data to entities outside of the second geographic region 104.

For instance, the first data controller 116 may determine that the query 122 is requesting data that includes sensitive data. Based on determining that the query 122 is requesting the sensitive data, the first data controller 116 may determine where the data evaluator 108 is located. In various implementations, the data controller 116 can determine that the data evaluator 108 is located in the first geographic region 102 based on the query 122 itself or based on some other message received from the first device(s) 106 and/or data evaluator 108, such as a passport. In the implementation illustrated in FIG. 1, the first data controller 116 may determine that the data evaluator 108 is located outside of the second geographic region 104. In particular examples, the first data controller 116 may determine that the data evaluator 108 is located in the first geographic region 102. Thus, the first data controller 116 may infer that the data evaluator 108 is out of compliance with the data privacy rule.

Based on inferring that the data evaluator 108 does not comply with the data privacy rule, the first data controller 116 may return incomplete data 124 to the data evaluator 108. In various implementations, the incomplete data 124 omits the sensitive data, such that the first data controller 116 can maintain compliance with the data privacy rule. If the requested data includes non-sensitive data, the non-sensitive data may be included in the incomplete data 124. If the requested data is exclusively sensitive data, the incomplete data 124 may omit the requested data entirely. In various cases, the incomplete data 124 may include an indication that at least some of the requested data has been withheld due to the data privacy rule.

According to some examples, the first data controller 116 may further track the exposure of any data stored in the first datastore 120. For example, upon transmitting the incomplete data 124 to the data evaluator 108, the first data controller 116 may add an entry to a log 126 that identifies the geographic region 102, the first device(s) 106, the data evaluator 108, the data included in the incomplete data 124, or any combination thereof. In some cases, the first data controller 116 adds entries into the log 126 that indicate sensitive data from the first datastore 120 that has been transmitted to other entities and/or identifiers of the other entities. Accordingly, a user may later confirm that the first data controller 116 has complied with the data privacy rule by accessing the log 126.

Upon receiving the incomplete data 124, the data evaluator 108 may, in some cases, generate a response 128 to the request 114 based on the incomplete data 124. According to some cases, the response 128 may further indicate that the response 128 is incomplete (i.e., that the response 128 was generated based on the incomplete data 124). In some implementations, the response 128 indicates that the reason why the response 128 is incomplete is due to the data privacy rule. The data evaluator 108 may transmit the response 138 to the user device 110 via the API 112. The user device 110 may output the response 128 to the user.

In various implementations, instead of generating the response 128 based on the incomplete data 124, the data evaluator 108 may perform one or more remedial actions. For instance, the data evaluator 108 may migrate to one or more devices in the second geographic region 104 and repeat the aforementioned processes from within the second geographic region 104. The first data controller 116, upon determining that the data evaluator 108 is located in the second geographic region 104, may provide a complete version of the requested data to the data evaluator 108. In some cases, the response 128 may be generated based on sensitive data, but may itself omit sensitive data, such that the data evaluator 108 may transmit the response 128 to the user device 110 from the second geographic region 104 while remaining in compliance with the data privacy rule of the second geographic region 104.

In some cases, the data evaluator 108 may obtain the data from a different part of the mesh. For example, the data evaluator 108 may transmit the query 122 to a second data controller 130 executed by at least one third device 132. The second data controller 30 may include a second datastore 134 that stores the data requested in the query 122. However, unlike the first data controller 116, the second data controller 130 may be located in the first geographic region 102.

According to some cases, the first geographic region 102 may be associated with a different data privacy rule than the second geographic region 102, or may not be associated with any data privacy rule at all. For example, the second data controller 130 may confirm that the data evaluator 108 is located in the same geographic region as the second data controller 130 (e.g., the first geographic region 102) or may refrain from determining or confirming the location of the data evaluator 108 at all. As a result, the second data controller 130 may return full data 136 to the data evaluator 108. The full data 136 may include all of the data requested in the query 122, including the sensitive data missing from the incomplete data 124. In various cases, the data evaluator 108 may generate the response 128 based on the full data 136 and may return the response 128 to the user device 110 via the API 112. Although not specifically illustrated in FIG. 1, the second data controller 130 may further include a log and may add an entry to the log that identifies the first geographic region 102, the first device(s) 106, the data evaluator 108, the data included in the full data 134, or any combination thereof. In some cases, the second data controller 130 adds entries into the log that indicate sensitive data from the second datastore 134 that has been transmitted to other entities and/or identifiers of the other entities. Accordingly, a user may later confirm that the second data controller 130 has complied with a data privacy rule applicable to the first geographic region 102 by accessing the log.

A specific example will now be described with reference to FIG. 1. In this example, the user device 110 may transmit the request 114 that asks "how many customers of company X live in region Y?" The API 112 receives the request and the data evaluator 108 may determine that in order to answer the question posed by the request 114, the data evaluator 108 may review the addresses of the customers of company X and determine the number of those addresses that are in region Y. The addresses of the customers of company X may be stored elsewhere, such as in the first datastore 120 of the first data controller 116. Accordingly, the data evaluator 108 may transmit the query 122 to the first data controller 116, wherein the query requests the addresses of the customers of company X.

In this example, the first geographic region 102 may be the US and the second geographic region 104 may be the EU. Under the EU's GDPR, entities within the second geographic region 104 are directed to refrain from sharing personal data with entities outside of the EU. When the first data controller 116 receives the query 122, the first data controller 116 may determine that the requested addresses qualify as personal data. In addition, the first data controller 116 may determine that the data evaluator 108 transmitting the query 122 is located outside of the EU. Thus, the first data controller 116 may refrain from transmitting the addresses of customers of company X to the data evaluator 108. The first data controller 116 may, however, transmit an indication that the EU's GDPR prevents the first data controller 116 from sharing the addresses to the data evaluator 108.

Because the data evaluator 108 is unable to acquire the requested addresses from the first data controller 116, the data evaluator 108 may transmit the query 122 to the second data controller 130, which is also located in the US. Because the second data controller 130 is not located in the EU, the second data controller 130 is not obligated to be in compliance with the EU's GDPR. Accordingly, the second data controller 130 may access the addresses of the customers of company X in the second data store 134 and return them to the data evaluator 108 as the full data 136.

Once the data evaluator 108 receives the complete set of addresses of the customers of company X, the data evaluator 108 may generate the response 128 based on the addresses. For example, the data evaluator 108 may determine how many of the addresses are located in region Y and generate the response 128 indicating the number of the addresses located in the region Y. Using the API 112, the data evaluator 108 may transmit the response 128 to the user device 110.

Notably, the response 128 itself may omit personal data, even though the addresses of the customers of company X were personal data. That is because the response 128 does not indicate any identified or identifiable individuals. Thus, if the data evaluator 108 was migrated to the second geographic region 104, the data evaluator 108 would nevertheless be able to return the response 128 to the user device 110 from the second geographic region 104, regardless of whether the user device 110 is located in the second geographic region 104.

Figure 2:
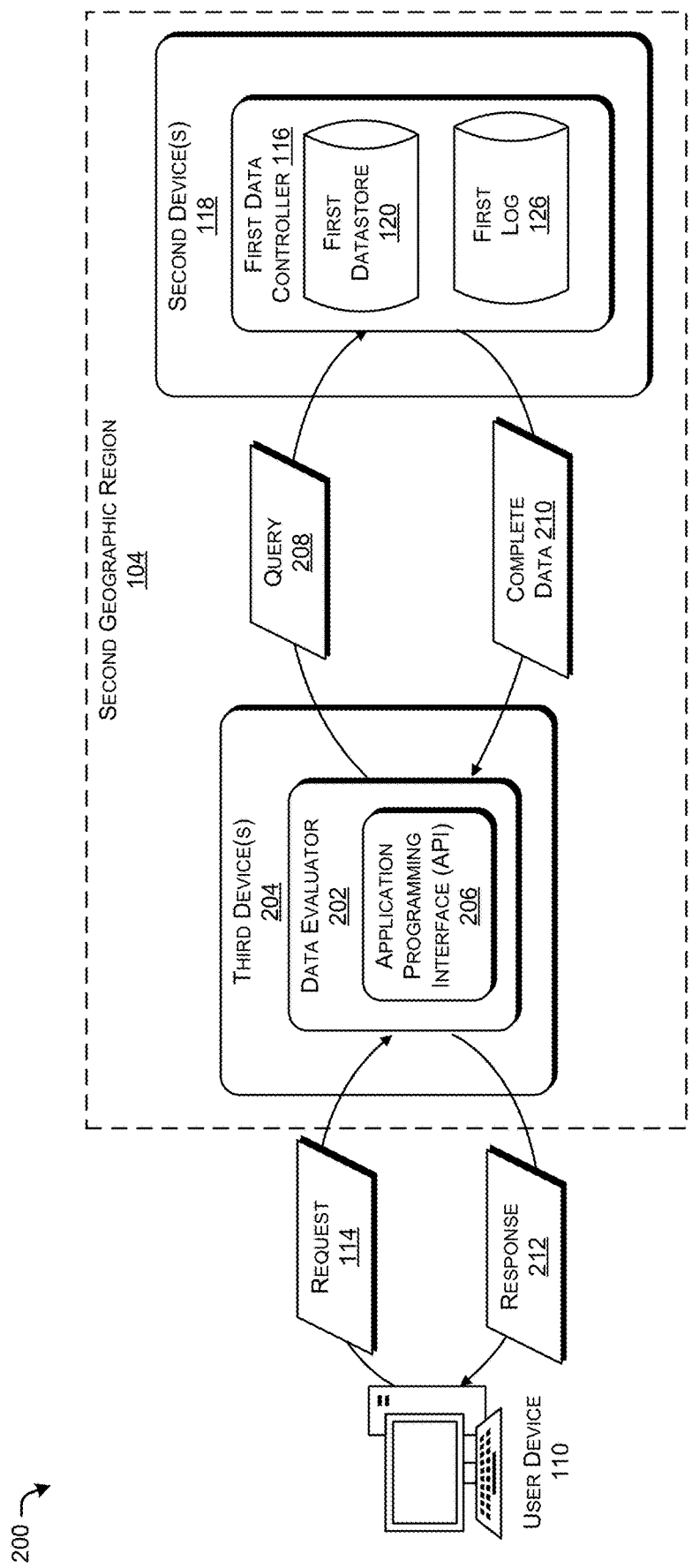
FIG. 2 illustrates an example environment for maintaining sensitive data in a cloud-based network that is distributed over a single geographic region.

FIG. 2 illustrates an example environment 200 for maintaining sensitive data in a cloud-based network that is distributed over a single geographic region. As shown, the environment 200 includes the second geographic region 104, the user device 110, the first data controller 116, the second device(s) 118, the first datastore 120, and the log 126 described above with reference to FIG. 1.

In various implementations, the user device 110 may have sent the request 114 to the data evaluator 108 in the first geographic region 102. Further, the data evaluator 108 may have sent the query 122 to the first data controller 116 in the second geographic region 104, which may have returned incomplete data 124 to the data evaluator 108. Unable to adequately fulfill the request 114 using the incomplete data 124, the data evaluator 108 may have sent the response 128 to the user device 110 indicating that the request 114 could not be fulfilled because the data evaluator 108 was not located in the second geographic region 104.

Upon receiving the response 128 from the data evaluator 108, the user device 110 may attempt to resubmit the request 114 to an alternate data evaluator 202 executed by at least one third device 204 in the second geographic region 104. In some cases, the data evaluator 202 is implemented in software executed by the third device(s) 204. For example, the data evaluator 202 may be a VM operating on the third device(s) 204, a microservice executed by the third device(s) 204, a process executed by the third device(s) 204, or the like. According to some implementations, the data evaluator 202 is part of a confidential computing environment and is executed within a TEE of the third device(s) 204. The user device 110 may interact with the data evaluator 202 via an API 206.

In various implementations, the data evaluator 202 may determine that fulfilling the request 114 depends on data that is not directly accessible by the data evaluator 202. For example, the data may be stored outside of the third device(s) 204. Accordingly, the data evaluator 202 may transmit a query 208 to the first data controller 116, wherein the query 208 requests the data.

The first data controller 116 may determine that the data includes sensitive data that is subjected to the data privacy rule of the second geographic region 104. Further, the first data controller 116 may determine that the data evaluator 202 is within the second geographic region 104. Thus, the first data controller 116 can share the sensitive data with the data evaluator 202 while remaining in compliance with the data privacy rule of the second geographic region 104.

The first data controller 116 may return complete data 210 to the data evaluator 202, wherein the complete data 210 includes the sensitive data requested in the query 208. The data evaluator 202 can generate an answer to the question specified in the request 114 based on the complete data 210. The answer may be included in a response 212 transmitted by the data evaluator 202 to the user device 110.

Figure 3:
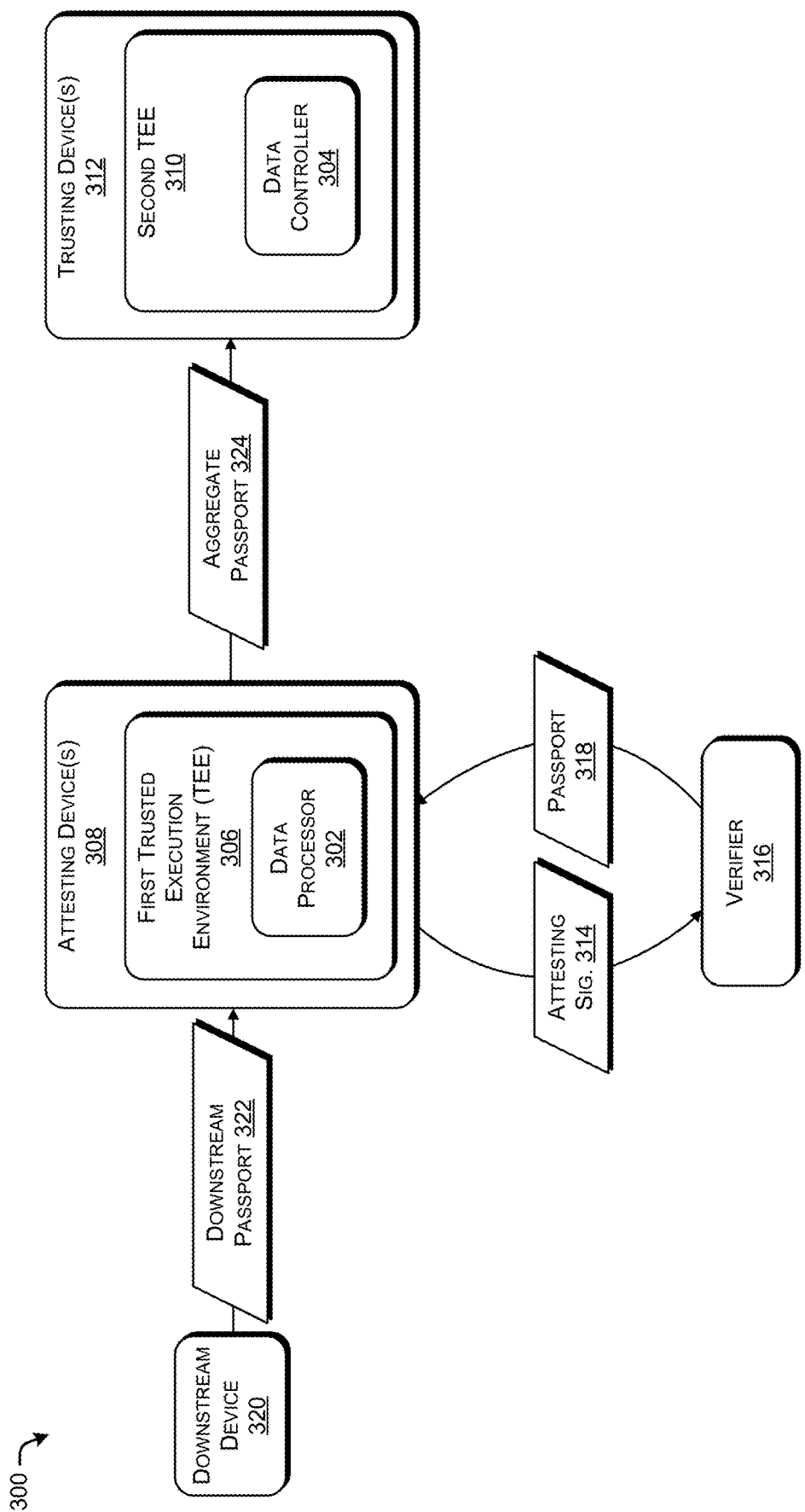
FIG. 3 illustrates example signaling for identifying the location of a device in a networked environment.

FIG. 3 illustrates example signaling 300 for identifying the location of a device in a networked environment. As shown, the signaling 300 involves a data evaluator 302 and a data controller 304. The data evaluator 302, for example, may be the data evaluator 108 described above with reference to FIG. 1. In some implementations, the data controller 304 may be the first data controller 116 or the second data controller 130 described above with reference to FIG. 1.

The data evaluator 302 and the data controller 304 may be part of a confidential computing mesh within the networked environment. For instance, the data evaluator 302 may operate within a first TEE 306 of at least one attesting device 308. The data controller 304 may operate within a second TEE 310 of at least one trusting device 312. The attesting device(s) 308 may store any data associated with the data evaluator 302 in an encrypted format and the trusting device(s) 312 may store any data associated with the data controller 304 in an encrypted format. Any data transmitted between the data evaluator 302 and the data controller 304 may be transmitted in an encrypted format.

In various implementations, the data controller 304 may be configured to confirm that the data evaluator 302 is located in a predetermined geographic region (e.g., the same geographic region as the data controller 304) prior to sharing sensitive data with the data evaluator 302. In some cases, the data controller 304 determines the location of the data evaluator 302 using a passport-based attestation technique.

The data controller 304 may transmit an attesting signature 314 to a verifier 316. The verifier 316, for example, may operate on the attesting device(s) 308 or some other computing device within the networked environment. In various implementations, the verifier 316 may be isolated from the data evaluator 302. The attesting signature 314 may indicate features about the data evaluator 302, the first TEE 306, the attesting device(s) 308, or a combination thereof. For instance, the attesting signature 314 may indicate one or more trustworthiness characteristics of the data evaluator 302, the first TEE 306, the attesting device(s) 308, or the combination, such as executables, configuration, file types utilized, hardware, firmware, and so on. In some cases, the attesting signature 314 may specifically indicate hardware-based features about the attesting device(s) 308, such as details about the first TEE 306 (e.g., a model of a chip including the first TEE 306). In some cases, the attesting signature 314 includes data indicating the geographical region in which the attesting device(s) 308 are provisioned.

The verifier 316 is configured to verify the entity providing the attesting signature 314 and to generate a passport 318 based on the attesting signature 314. According to various cases, the verifier 316 may determine whether the entity is trustworthy and indicate the trustworthiness of the entity in the passport 318. In various implementations, the passport 318 has a standardized format within the networked environment, and indicates various details about the data evaluator 302, the first TEE 306, the attesting device(s) 308, or any combination thereof. In particular implementations, the passport 318 includes data indicating the geographic region where the attesting device(s) 308 are located. The passport 318 may include one or more trustworthiness characteristics of the data evaluator 302, the first TEE 306, the attesting device(s) 308, or a combination thereof that have been validated by the verifier 316. In some cases, the passport 318 may indicate a time at which the verifier 316 generated the passport 318, which may indicate a freshness of the passport 318. Further, the passport 318 may include a signature of the verifier 316.

In some cases, the data evaluator 302 may transmit the passport 318 to the data controller 304. According to some implementations, the data evaluator 302 may combine the attesting signature 314 with the passport 318 and transmit the combination to the data controller 304. The data controller 304 may determine whether the geographic region indicated in the passport 318 is the predetermined geographic region. However, the passport 318 of the attesting device(s) 308 may not be sufficient to show other geographic regions that the data evaluator 302 may expose the sensitive data to, if it receives the sensitive data from the data controller 304. For example, the data evaluator 302 may be connected to a downstream device 320 operating another component of the mesh.

To ensure that the data controller 304 is aware of the posture (e.g., including geolocation) of the attesting device(s) 308 on which the data evaluator 302 is operating, as well as the posture (e.g., including geolocation) of the downstream device 320, the data evaluator 302 may receive a downstream passport 322 from the downstream device 320. The downstream passport 322, for example, may be provided by the verifier 316 or by some other verifier communicatively coupled to the downstream device 320. The downstream passport 322 may indicate the security posture of the downstream device 320. For example, the downstream passport 322 may indicate the geographic region in which the downstream device 320 is located.

In various implementations, the data evaluator 302 may generate an aggregate passport 324 based on the passport 318 and the downstream passport 322. In some implementations, the aggregate passport 324 has been signed by the attesting signature 314 as well as the signature of the verifier 316. The aggregate passport 324, for instance, indicates an intersection of the postures of the attesting device(s) 308 and the downstream device 320. For example, if the passport 318 and the downstream passport 322 indicate that the attesting device(s) 308 and the downstream device 320 are located in the same geographical region, then the aggregate passport 324 may indicate that geographical region. If the passport 318 and the downstream passport 322 indicate different geographical regions, then the aggregate passport 324 may indicate the different geographical regions, or potentially no geographic regions. In various implementations, the aggregate passport 324 may indicate other security posture information of the attesting device(s) 308 and the downstream device 320. For example, if the attesting device 308 applies a security policy indicated in the passport 318, but the downstream passport 322 indicates that the downstream device 320 does not apply the security policy, then the aggregate passport 324 may indicate that the security policy is not applied to the portion of the mesh including the attesting device(s) 308 and the downstream device 320.

The data controller 304, in various implementations, may determine whether to share sensitive data with the attesting device(s) 308 based on the aggregate passport 324. For example, if the data controller 304 determines, based on the aggregate passport 324, that the attesting device(s) 308 (and/or the downstream portion of the mesh including the attesting device(s) 308 and the downstream device 320) are in a predetermined geographical region, then the data controller 304 may transmit the sensitive data to the data evaluator 302. If, however, the data controller 304 determines that the attesting device(s) 308 (and/or the downstream portion of the mesh including the attesting device(s) 308 and the downstream device 320) are not in the predetermined geographical region, then the data controller 304 may refrain from transmitting the sensitive data to the data evaluator 302. In some implementations, the data controller 304 may send a message to the data evaluator 302 indicating that the sensitive data is being withheld and/or the reason that the sensitive data is being withheld.

Although FIG. 3 only illustrates a single downstream device 320, implementations are not so limited. For example, the downstream portion of the mesh may include additional downstream devices connected to the downstream device 320. In various cases, the downstream passport 322 may be generated by the downstream device 320 similarly to how the attesting device(s) 308 generate the aggregate passport 324. That is, the downstream device 320 may generate the downstream passport 322 to reflect the intersection of the security posture of the downstream device 320 and the other downstream devices. Thus, aggregated passports can be generated recursively throughout the mesh, such that upstream devices are informed of the aggregate security posture of downstream devices within the mesh.

Figure 4:
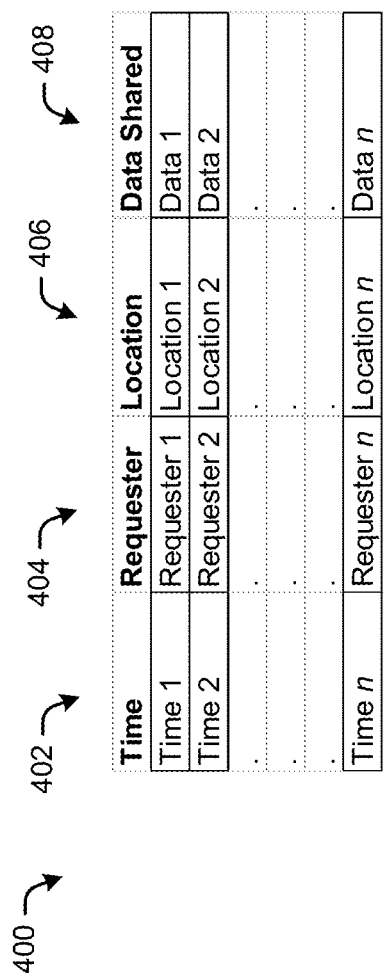
FIG. 4 illustrates an example data log maintained by a data controller.

FIG. 4 illustrates an example data log 400 maintained by a data controller. For example, the data log 400 may be the log 126 of the first data controller 116 described above with reference to FIG. 1. The data log 400 may store various entries that indicate any sharing, by the data controller, of sensitive data with other entities.

In the example illustrated in FIG. 4, the data log 400 includes n entries, wherein n is a positive integer. Each of the entries includes multiple data fields, such as a time field 402, a requester field 404, a location field 406, and a data shared field 408. The time filed 402 may indicate the time at which data was shared with (e.g., transmitted to) another entity (e.g., a data evaluator) and/or the time at which the data controller received a request for the data from the other entity. In various implementations, the requester field 404 may identify the entity that has requested the data. For example, the requester field 404 may include an address (e.g., an IP address) of a data evaluator that has requested the data. The location field 406 may indicate the geographic location of the entity that has requested the data. For instance, the location field 406 may indicate the geographic region where the entity is located. The data shared field 408 may identify the data that has been transmitted to the entity. For example, the data shared field 408 may indicate whether the data includes sensitive data, whether any requested data was withheld from the entity, a location of the shared data in a datastore maintained by the data controller, or some other type of identifier for the data shared with the entity.

In various implementations, the data log 400 may be accessed by a user device. In some cases, some or all of the entries in the data log 400 may be exported to the user device in the form of a report. The user device may output the report to a user. Accordingly, the user may review the entries and confirm whether the data controller has complied with an applicable data privacy rule.

Figure 5:
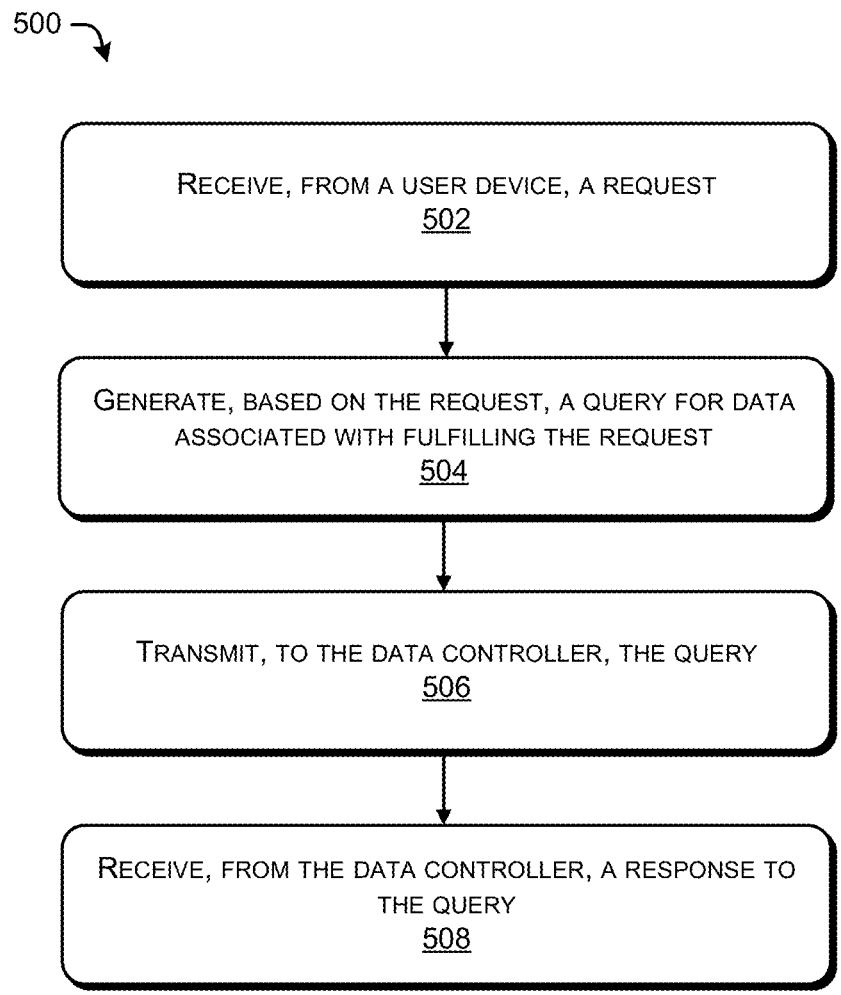
FIG. 5 illustrates an example process for requesting sensitive data from a data controller.

FIG. 5 illustrates an example process 500 for requesting sensitive data from a data controller. The process 500 may be performed by an entity including a data evaluator, such as the data evaluator 108 described above with reference to FIG. 1 or the data evaluator 202 described above with reference to FIG. 2.

At 502, the entity receives, from a user device, a request. In various cases, the request may be for a particular response. The entity may determine that fulfilling the request and/or generating the response may involve processing data. However, the data may be unavailable to the entity. For example, the entity may determine that the data is not stored by the entity.

At 504, the entity generates, based on the request, a query for data associated with fulfilling the request. In various implementations, the entity may determine that the data is stored in a data controller. The query may be addressed to the data controller. The query may specify the data that can be used to fulfill the request from the user device. In some cases, the query may include an indication of a geographic region in which the entity resides.

At 506, the entity transmits, to the data controller, the query. According to various implementations, the entity transmits the query over one or more wired networks, one or more wireless networks, or a combination thereof. In various implementations, the entity transmits the geographic region in which it resides in another message transmitted to the data controller, such as a passport.

At 508, the entity receives, from the data controller, a response to the query. In various cases, the response includes at least a portion of the data associated with fulfilling the request. For example, if the data controller determines that the entity complies with a data privacy rule applicable to the data controller, then then response may include a complete copy of the data requested by the entity. However, if the requested data includes sensitive data and the data controller determines that the entity is out of compliance with the data privacy rule (e.g., the entity is not located within an appropriate geographic region), then the response may omit the sensitive data. According to some examples, the response may indicate that the sensitive data was withheld from the response and/or a reason why the sensitive data was withheld.

Figure 6:
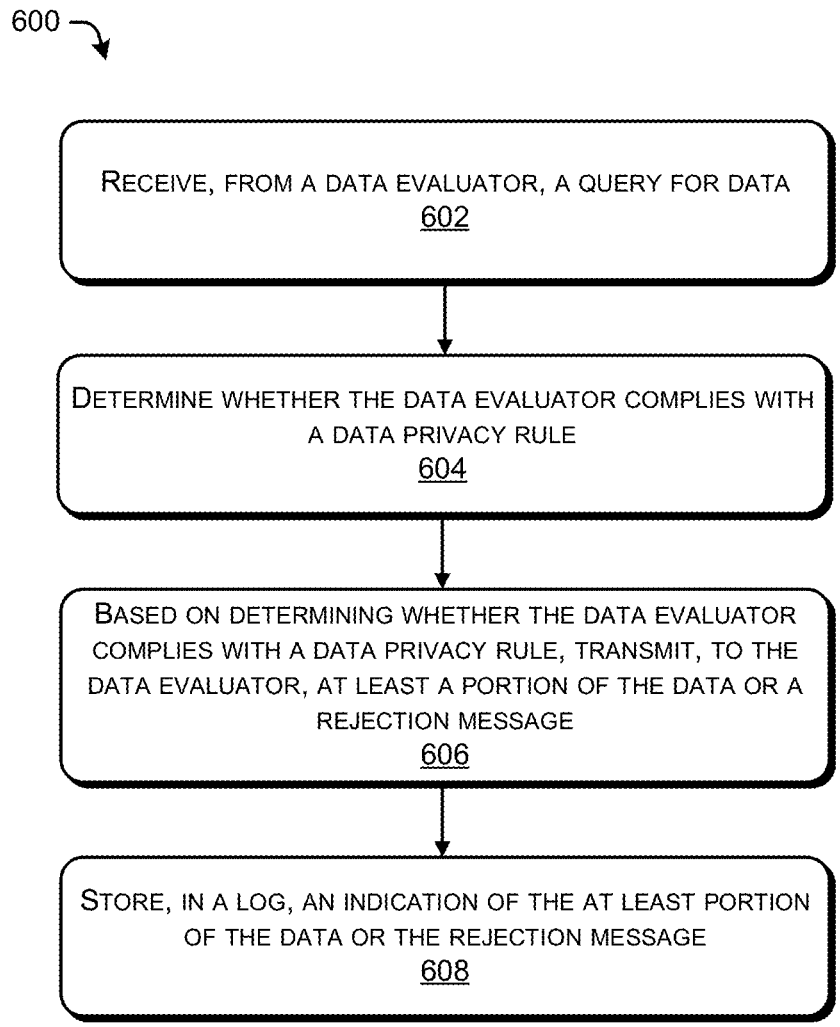
FIG. 6 illustrates an example process for selectively providing sensitive data to a data controller.

FIG. 6 illustrates an example process 600 for selectively providing sensitive data to a data controller. The process 600 may be performed by an entity including a data controller, such as the first data controller 116 or the second data controller 130 described above with reference to FIG. 1, or the data controller 116 described above with reference to FIG. 2.

At 602, the entity receives, from a data evaluator, a query for data. In various implementations, the data may be associated with fulfilling a request from a user device. The device may include sensitive data, such as personal data stored or otherwise maintained by the entity.

At 604, the entity determines whether the data evaluator complies with a data privacy rule. In some implementations, the entity identifies a geographic region in which the data evaluator resides. For example, the query may indicate the geographic region of the data evaluator. In some cases, the entity receives a passport from the data evaluator that indicates the geographic region where the data evaluator is located. The data privacy rule may prohibit sharing sensitive data to one or more geographic regions. Thus, the entity may determine if the geographic region of the data evaluator complies with the data privacy rule.

At 606, based on determining whether the data evaluator complies with the data privacy rule, the entity transmits, to the data evaluator, at least a portion of the data or a rejection message. In examples in which the data evaluator does not comply with the data privacy rule, the entity may refrain from transmitting the sensitive data to the data evaluator. For instance, if the query requested only sensitive data, the entity may transmit a rejection message to the data evaluator that indicates what data was withheld and/or the reason why the data was withheld (e.g., noncompliance with the data privacy rule). In examples in which the data evaluator complies with the data privacy rule, the entity may transmit the sensitive data to the data evaluator.

At 608, the entity stores, in a log, an indication of the at least portion of the data or the rejection message. The entity may add an entry to the log indicating whether data was shared with the data evaluator, what data was shared with the data evaluator, and other details about the interaction with the data evaluator. In some implementations, the entry may be accessed by an external device at a later time.

Figure 7:
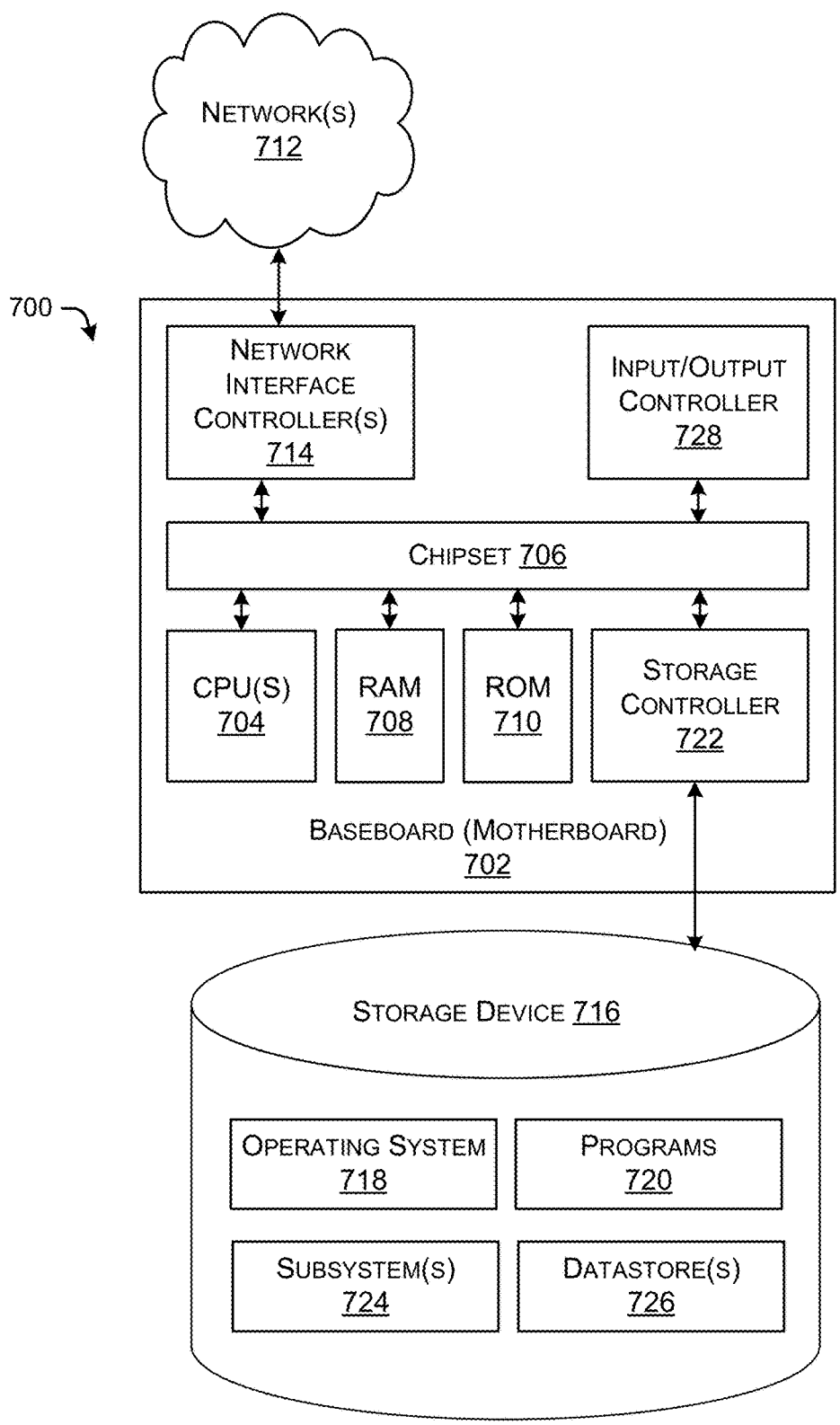
FIG. 7 shows an example computer architecture for a server computer capable of executing program components for implementing the functionality described herein.

FIG. 7 shows an example computer architecture for a server computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like. In various implementations, the CPUs 704 include at least one TEE.

The chipset 706 provides an interface between the CPUs 704 and the remainder of the components and devices on the baseboard 702. The chipset 706 can provide an interface to a random-access memory (RAM) 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through at least one network 712. The chipset 706 can include functionality for providing network connectivity through at least one network interface controller (NIC) 714, such as a gigabit Ethernet adapter. The NIC(s) 714 are capable of connecting the computer 700 to other computing devices over the network(s) 712. It should be appreciated that multiple NICs 714 can be present in the computer 700, connecting the computer 700 to other types of networks and remote computer systems. In some instances, the NICs 714 may include at least on ingress port and/or at least one egress port.

The computer 700 can be connected to a storage device 716 that provides non-volatile storage for the computer. The storage device 716 can store an operating system 718, programs 720, and data, which have been described in greater detail herein. The storage device 716 can be connected to the computer 700 through a storage controller 722 connected to the chipset 706. The storage device 716 can consist of one or more physical storage units. The storage controller 716 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 700 can store data on the storage device 716 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 716 is characterized as primary or secondary storage, and the like.

For example, the computer 700 can store information to the storage device 716 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 716 by detecting the physical states or characteristics of one or more particular locations within the physical storage units.

In addition to the mass storage device 716 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by any network node described herein may be supported by one or more devices similar to computer 700. Stated otherwise, some or all of the operations performed by a network node may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 716 can store an operating system 718 utilized to control the operation of the computer 700. According to one embodiment, the operating system comprises the LINUX™ operating system. According to another embodiment, the operating system includes the WINDOWS' SERVER operating system from MICROSOFT Corporation of Redmond, Washington. According to further embodiments, the operating system can comprise the UNIX™ operating system or one of its variants. It should be appreciated that other operating systems can also be utilized. The storage device 716 can store other system or application programs and data utilized by the computer 700.

In one embodiment, the storage device 716 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

As illustrated in FIG. 7, the storage device 716 stores programs 720, which may include one or more processes, as well as at least one subsystem 724 and at least one datastore(s) 726. The subsystem(s) 724 and datastore(s) 726 may include any subsystem or datastore described above with reference to FIGS. 1-6. The subsystem(s) 724 may include instructions that, when executed by the CPU(s) 704, cause the CPU(s) 704 (e.g., a TEE of the CPU(s) 704) to perform one or more operations.

The computer 700 can also include one or more input/output controllers 728 for receiving and processing input from a number of input devices, such as a keyboard, a mouse, a touchpad, a touch screen, an electronic stylus, or other type of input device. Similarly, an input/output controller 728 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method performed by an entity, the method comprising:
   receiving a request from a user device;
   generating, based on the request, a query for data associated with fulfilling the request;
   transmitting, to a data controller, the query;
   transmitting, to the data controller, an aggregate passport indicating at least one geographic region in which at least one device implementing the entity is located and in which at least one downstream device communicatively coupled to the entity is located; and
   receiving, from the data controller, a portion of the data associated with fulfilling the request, wherein the data controller is permitted to send the portion of the data under a data privacy rule to which the data controller is subject and which applies to the at least one geographic region.

2. The method of claim 1, the at least one geographic region being at least one first geographic region, the at least one device being at least one first device, wherein the data controller is implemented by at least one second device located in a second geographic region, the data privacy rule of the second geographic region being different than another data privacy rule of the first geographic region.

3. The method of claim 1, further comprising:
   generating a response based on the portion of the data; and
   transmitting, to the user device via an application programming interface (API) implemented by the entity, the response,
   wherein the request is received by the API.

4. The method of claim 3, the portion of the data being a first portion of the data, the method further comprising:
   receiving, from the data controller, an indication that a second portion of the data is subjected to the data privacy rule,
   wherein the response further indicates that the response is a partial response because the data controller is subjected to the data privacy rule.

5. The method of claim 1, the data controller being a first data controller, the method further comprising:
based on receiving the portion of the data, transmitting, to a second data controller, the query;
receiving, from the second data controller, a complete copy of the data;
generating a response based on the complete copy of the data; and
transmitting, to the user device via an application programming interface (API), the response.

6. The method of claim 1, wherein at least one of:
the entity comprises a trusted execution environment (TEE) of a first device; or
the data controller is implemented in a TEE of a second device.

7. The method of claim 1, further comprising:
receiving, from the downstream device, a downstream passport indicating a first geographic region in which the downstream device is located; and
generating the aggregate passport based on the first geographic region in which the downstream device is located and a second geographic region in which the entity is located.

8. The method of claim 1, wherein the aggregate passport further indicates at least one security policy applied to the entity and the at least one downstream device, and
wherein the data privacy rule further applies to the at least one security policy.

9. A system, comprising:
at least one processor; and
one or more non-transitory media storing instructions that, when executed by the system, cause the system to perform operations comprising:
generating, based on a request from a user device, a query for data associated with fulfilling the request;
transmitting, to a data controller, the query;
transmitting, to the data controller, an aggregate passport indicating at least one geographic region in which at least one device implementing the system is located and in which at least one downstream device communicatively coupled to the system is located; and
receiving, from the data controller, a portion of the data associated with fulfilling the request, wherein the data controller is permitted to send the portion of the data under a data privacy rule to which the data controller is subject and which applies to the at least one geographic region.

10. The system of claim 9, the at least one geographic region being at least one first geographic region, the at least one device being at least one first device, wherein the data controller is implemented by at least one second device located in a second geographic region, the data privacy rule of the second geographic region being different than another data privacy rule of the at least one first geographic region.

11. The system of claim 9, wherein the request is received by an application programming interface (API) implemented by the system.

12. The system of claim 9, the operations further comprising:
generating a response based on the portion of the data; and
transmitting, to the user device via an application programming interface (API), the response.

13. The system of claim 12, the portion of the data being a first portion of the data, the operations further comprising:
receiving, from the data controller, an indication that a second portion of the data is subjected to the data privacy rule,
wherein the response further indicates that the response is a partial response because the data controller is subjected to the data privacy rule.

14. The system of claim 10, the data controller being a first data controller, the operations further comprising:
based on receiving the portion of the data, transmitting, to a second data controller, the query;
receiving, from the second data controller, a complete copy of the data;
generating a response based on the complete copy of the data; and
transmitting, to the user device via an application programming interface (API), the response.

15. The system of claim 10, wherein the system comprises a trusted execution environment (TEE) of at least one first device, and
wherein the data controller is implemented in a TEE of at least one second device.

16. A system, comprising:
at least one processor comprising a trusted execution environment (TEE); and
memory storing instructions that, when executed by the TEE, cause the TEE to perform operations comprising:
receiving, from a downstream device communicatively coupled to the system, a downstream passport indicating a geographic region in which the downstream device is located;
generating an aggregate passport based on the geographic region in which the downstream device is located and the geographic region in which the system is located;
receiving, via an application programming interface (API), a request from a user device;
generating, based on the request, a query for data associated with fulfilling the request, the data comprising information related to at least one identified and/or identifiable person;
transmitting, to a data controller subjected to a more stringent data privacy rule than the system, the query;
transmitting, to the data controller, an indication of a geographic region in which the system is located by transmitting the aggregate passport to the data controller;
receiving, from the data controller, a portion of the data associated with fulfilling the request, the portion of the data omitting the information related to at least one identified and/or identifiable person;
generating a response based on the portion of the data; and
transmitting, via the API, the response to the user device.

17. The system of claim 16, the geographic region being a first geographic region, wherein the data controller is implemented by a TEE of at least one device located in a second geographic region.

18. The system of claim 16, wherein the operations further comprise:
receiving, from the data controller, an indication that the personal data is omitted from the portion of the data because of the more stringent data privacy rule, and
wherein the response indicates that the response is incomplete because of the more stringent data privacy rule.

19. The system of claim 16, the data controller being a first data controller, the response being a first response, the operations further comprising:
- based on receiving the portion of the data, transmitting, to a second data controller, the query;
- receiving, from the second data controller, a complete copy of the data;
- generating a second response based on the complete copy of the data; and
- transmitting, to the user device via the API, the second response.

20. The system of claim 19, wherein the system is located in a geographic region, and
- wherein the second data controller is implemented by a TEE of at least one device located in the geographic region.

\* \* \* \* \*